United States Patent
Matsumoto et al.

(10) Patent No.: US 6,840,131 B2
(45) Date of Patent: Jan. 11, 2005

(54) PEDAL SUPPORTING STRUCTURE

(75) Inventors: Yasuaki Matsumoto, Tokyo (JP); Hideaki Hatakenaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/170,705

(22) Filed: Jun. 14, 2002

(65) Prior Publication Data
US 2003/0056616 A1 Mar. 27, 2003

(30) Foreign Application Priority Data
Jun. 15, 2001 (JP) .................................... P.2001-181243

(51) Int. Cl.$^7$ ................................................ G05G 1/14
(52) U.S. Cl. .......................................... 74/512; 74/560
(58) Field of Search .......................... 180/274; 280/784; 74/512, 560

(56) References Cited

U.S. PATENT DOCUMENTS

| | | | |
|---|---|---|---|
| 3,451,288 A | * 6/1969 | Barton et al. .................. | 74/512 |
| 5,588,338 A | * 12/1996 | Carr et al. ..................... | 74/560 |
| 5,848,662 A | * 12/1998 | Sakaue ........................ | 180/274 |
| 5,983,746 A | * 11/1999 | Nawata et al. ................. | 74/512 |
| 5,996,440 A | 12/1999 | Nawata et al. | |
| 6,041,674 A | * 3/2000 | Kato ............................ | 74/512 |
| 6,055,883 A | * 5/2000 | Kato ............................ | 74/512 |
| 6,101,894 A | 8/2000 | Tiemann et al. | |
| 6,142,036 A | 11/2000 | Mizuma et al. | |
| 6,209,416 B1 | 4/2001 | Tiemann et al. | |
| 6,327,930 B1 | 12/2001 | Ono et al. | |
| 6,354,171 B1 | 3/2002 | Wolpert et al. | |
| 6,408,711 B1 | 6/2002 | Mizuma et al. | |
| 6,612,200 B1 | * 9/2003 | Rixon ......................... | 74/560 |

FOREIGN PATENT DOCUMENTS

| | | |
|---|---|---|
| DE | 19727259 | 6/1997 |
| DE | 197 27 259 | 1/1998 |
| EP | 0 659 615 A1 | 6/1995 |
| EP | 0 788 931 | 8/1997 |
| EP | 0788931 | 8/1997 |
| EP | 0 827 874 | 3/1998 |
| EP | 0895902 | 7/1998 |
| EP | 0 895 902 | 2/1999 |
| EP | 1 031 485 | 8/2000 |
| EP | 1059208 | 12/2000 |
| EP | 1 074 445 | 2/2001 |
| GB | 2 353 009 | 2/2001 |
| JP | A-9286256 | 11/1997 |
| JP | 2000-163146 | 6/2000 |
| JP | 2000-344064 | 12/2000 |
| WO | WO 02/14129 | 2/2002 |
| WO | WO 02/30718 | 4/2002 |

OTHER PUBLICATIONS

Copy of USSN 10/70,685, filed on Jun. 14, 2002.
Copy of USSN 10/162,569, filed on Jun. 6, 2002.

* cited by examiner

Primary Examiner—David A. Bucci
Assistant Examiner—Bradley J. Van Pelt
(74) Attorney, Agent, or Firm—Smith, Gambrell & Russell, LLP

(57) ABSTRACT

A pedal supporting structure for a vehicle includes a pedal bracket secured to a dash board, a pedal shaft for swingably supporting a pedal arm, a pin member for mounting the pedal shaft on the pedal bracket and a separation member secured to a support beam. An arm section of the separation member has a guide slot capable of a relative displacement of a pin member inserted to the pedal shaft and contacting the slanted surface. The arm section of the separation member has a slanted surface at the middle thereof. When an external force larger than a specified value is applied to a front part of the vehicle, due to the relative displacement between the pedal bracket and the separation member, the pin member comes out of the pedal shaft and as a result the pedal arm is separated from the pedal shaft.

5 Claims, 7 Drawing Sheets

PEDAL SUPPORTING STRUCTURE

BACKGROUND OF THE INVENTION

1. Field of the Invention

The present invention relates to a structure for supporting pedals such as a brake pedal, a clutch pedal and the like of a vehicle and more particularly to the structure for supporting a pedal for restricting an invasion of the pedal into a passenger compartment when an impact load is exerted to a front part of the vehicle.

2. Discussion of Prior Art

With respect to known pedal supporting structures for vehicles, there is a technique disclosed by EP 659615A1. In which, a pedal arm is rotatably supported at an upper end thereof by a pedal bracket. The pedal bracket is constituted by a pair of L-shaped arm members disposed opposite to each other in a transverse direction. The paired arm members are separated from each other at the left and right middle portions thereof and the pedal arm supporting section is formed between the paired arm members. Further, the rear part of the arm members gradually comes close to and finally contacts each other. The upper end of the pedal arm is constituted so as to be disconnected from respective bearing sections provided on the respective pedal arm supporting sections.

In thus constituted pedal supporting structure, when an external force is applied to a vehicle from a front side, the entire arm members are deformed and a middle portion thereof widens left and right. As a result, the pedal arm is disconnected at the upper end thereof from the bearing sections. Thus, the pedal is prevented from invading into a passenger compartment in an event of collision of the vehicle.

However, since the pedal bracket, namely the paired arm members, are deformed such that a gap between the arm members widens left and right, a predetermined space for deformation of the pedal bracket must be ensured in the neighborhood of the pedal bracket, especially in a transverse direction of the vehicle, this restricting designs and layouts of the surrounding components of the pedal bracket. Further, in an event of collision of the vehicle, there is possibility that the upper end of the pedal arm would not come out of either of the bearing sections.

SUMMARY OF THE INVENTION

It is an object of the present invention to provide a pedal supporting structure in which the pedal can be securely disconnected from a pedal bracket to avoid injuries to occupants when an impact load is applied to a front part of a vehicle.

In order to attain the object, the pedal supporting structure comprises a pedal arm, a pedal shaft for swingably supporting an upper end of the pedal arm, a pedal bracket fixed on a first body member being displaced in a backward direction of the vehicle when an external force is applied to a front part of the vehicle, a pin member for detachably mounting the pedal shaft on the pedal bracket and a separation member fixed to a second body member hard to be displaced when an external force is applied to a front part of the vehicle and provided behind the first body member, for releasing the engagement of the pin member with the pedal shaft by generating a relative displacement between the first body member and the second body member when the external force is inputted and for separating the pedal shaft from the pedal bracket.

DESCRIPTION OF PREFERRED EMBODIMENT

Figure 1:
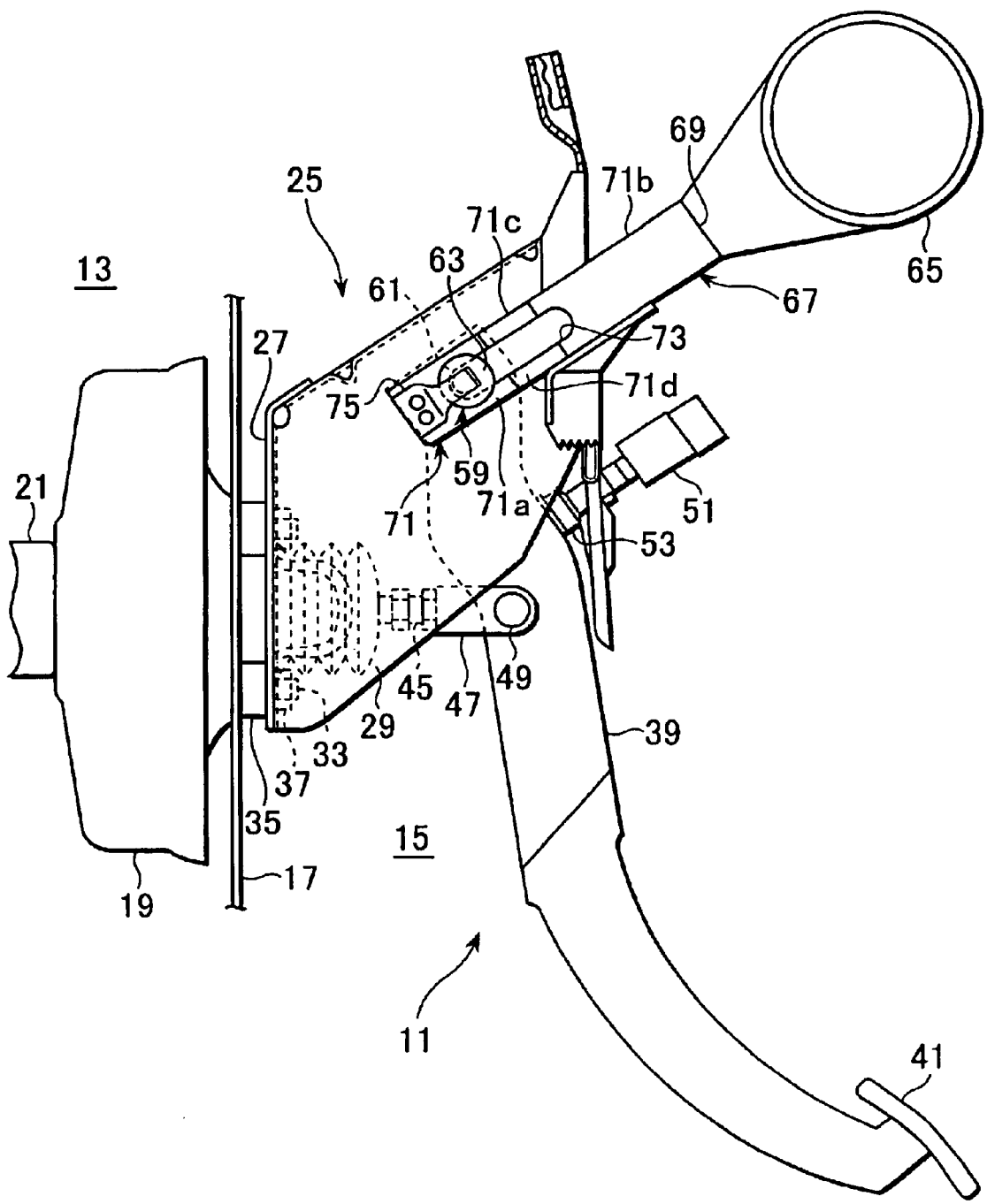
FIG. 1 is a side view showing a pedal supporting structure for a vehicle according to an embodiment of the present invention.
Figure 2:
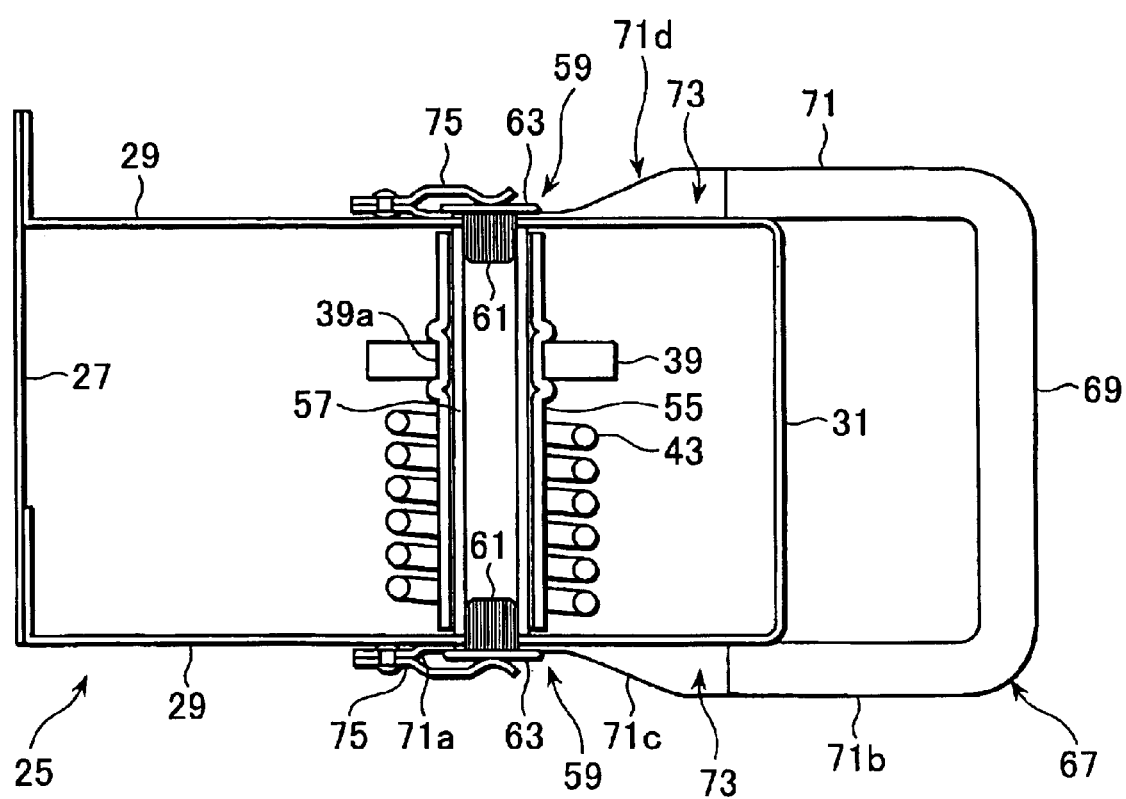
FIG. 2 is a sectional view showing a pedal supporting structure for a vehicle according to an embodiment of the present invention.

Referring now to FIGS. 1 and 2, reference numeral 11 denotes a suspending type brake pedal, reference numeral 13 denotes an engine room and reference numeral 15 denotes a passenger compartment. As shown in FIG. 1, the engine room 13 is separated from the passenger compartment 15 by a dash panel (toe board) 17 uprising vertically. The dash panel 17 is constituted so as to be displaced in a backward direction of a vehicle, when an external force larger than a specified value is applied to a front part of the vehicle. A brake booster 19 for boosting an occupant's braking effort, a master cylinder 21 for converting the boosted pressure into hydraulic pressure and a reservoir tank (not shown) for reserving and supplying brake fluid according to volumetric changes of a hydraulic system, are integrally disposed in front of the dash panel 17. Further, a pedal bracket 25 for swingably supporting the brake pedal 11 is disposed behind the dash panel 17.

As shown in FIG. 2, the pedal bracket 25 comprises a front panel 27 constituting a bearing surface on the dash panel 17, a pair of side panels 29, 29 rearwardly extending from both ends of the front panel 27 in parallel with each other and a rear panel 31 for integrally connecting both side panels 29, 29.

A plurality of stud bolts 33 rearwardly extending from the brake booster 19 and penetrate through respective cylindrical collars 35 secured to the front panel 27 of the pedal bracket 25. The front panel 27 is fixed to the dash panel 17 by screwing nuts 37 onto the stud bolts 33 in such a condition that the collars 35 abuts against the dash panel 17.

The brake pedal 11 of suspending type is disposed between the paired side panels 29, 29. The brake pedal 11 comprises a pedal arm 39 cut off from sheet metal and bent appropriately and a pedal pad 41 provided at the lower end of the pedal arm 39 and to which a driver's braking effort is given. The pedal arm 39 is provided with a return spring 43 biased in a direction to return the brake pedal 11 to an initial position.

The pedal arm 39 is connected at the middle thereof with a tip portion of a push rod (operating rod) 45 projecting from the brake booster 19 and passing through the dash panel 17.

Describing more in detail, a U-shaped or bifurcated clevis 47 is attached to the tip portion of the push rod 45. The pedal arm 39 is inserted into a bifurcated portion of the clevis 47 and a clevis pin 49 penetrates the bifurcated portion of the clevis 47 and the pedal arm 39 so as to allow a free rotation of the push rod 45. The clevis pin 49 is prevented from being dislocated from the clevis 47 by snap rings, stopper pins and the like. Further, a contact point 53 for contacting a brake switch 51 is provided on the middle section of the pedal arm 39.

The pedal arm 39 is secured to a cylindrical pedal boss 55 extending in a transverse direction of the vehicle at an upper end thereof. The pedal boss 55 is tightly fitted to a through hole 39a formed at the upper end of the pedal arm 39 so as to integrally rotate with the pedal arm 39.

The brake pedal 11 is rotatably supported by a cylindrical pedal shaft 57 loosely fitted to the pedal boss 55. The pedal shaft 57 is disposed across the paired side panels 29, 29 of the pedal bracket 25 and is mounted on the pedal bracket 25 by respective pin members 59, 59.

The pin member 59 comprises an insert section 59 inserted to the end of the pedal shaft 57 and a head 63 having a larger diameter than that of the insert section 59. The pedal shaft 57 is mounted on the pedal bracket 25 by inserting the insert members 61, 61 from outside of the side panels 29, 29 into respective ends of the pedal shaft 57 through holes formed on the side sections 29, 29, respectively.

A support beam (instrument panel reinforcement) 65 serving as a second transverse member withstanding an external force is disposed on the rear side of the dash panel 17 and a separation member 67 is secured to the support beam 65. The support beam 65 is fabricated by high strength material and extends in a transverse direction of the vehicle.

The separation member 67 has a U-shaped configuration and comprises a base member 69 fixed on the support beam 65 and a pair of arm sections 71, 71 extending forwardly in parallel with each other. The paired arm sections 71, 71 of the separation member 67 are disposed outside of the side panels 29, 29 with the pedal bracket 25 in between.

Figure 3:
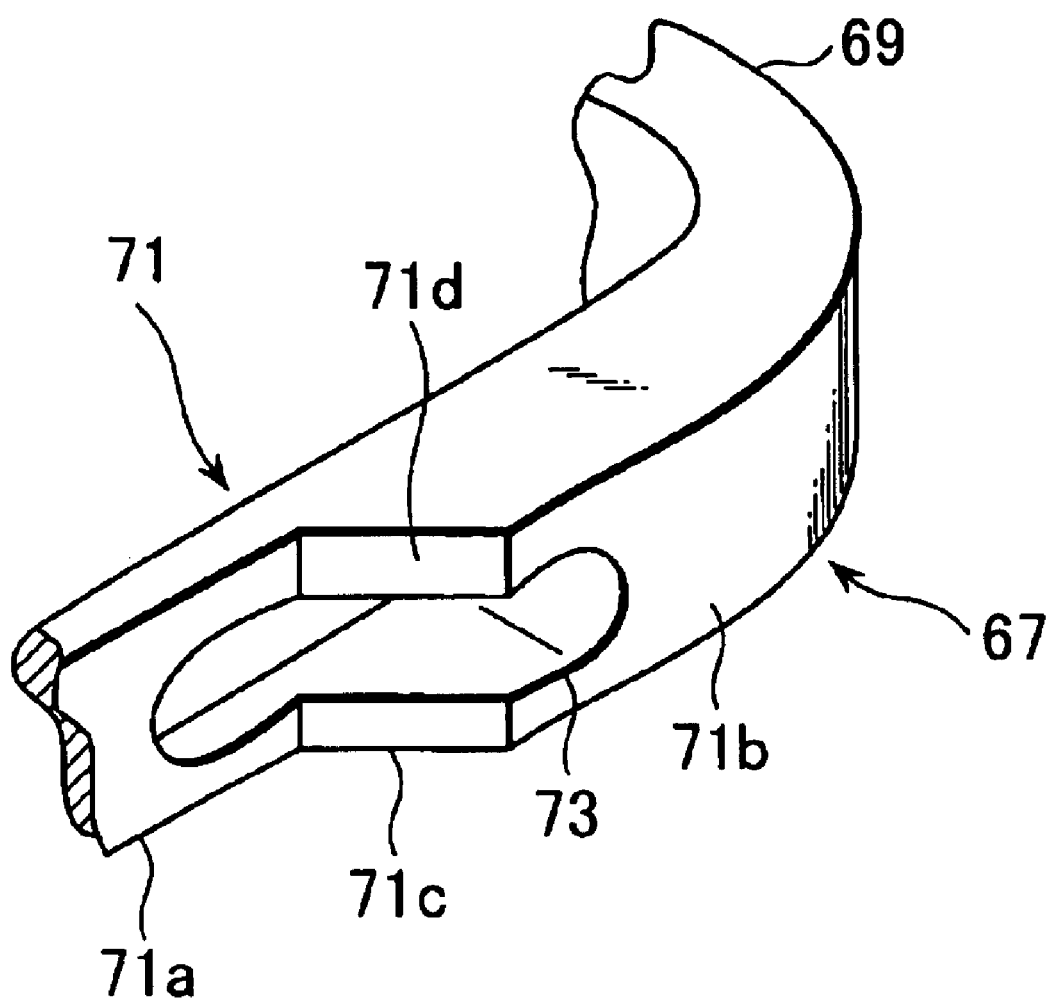
FIG. 3 is a perspective view showing a separation member included in a pedal supporting structure for a vehicle according to an embodiment of the present invention.

As shown in FIG. 3, the arm section 71 includes a tip section 71a having a widthwise thickness established to a first specified value, a base end section 71b having a widthwise thickness established to a second specified value larger than the first specified value and an intermediate section 71c having a widthwise thickness varying continuously from the first specified value to the second specified value in a rearward direction. Therefore, a slanted surface 71d is formed outside of the intermediate section 71c.

A guide slot 73 to which the insert section 61 can be inserted is formed in the respective arm sections 71, 71 between the tip section 71a and the base section 71b of the separation member 67. The guide slot is a slot extending in a longitudinal direction of the arm section 71. The insert section 61 is inserted to the pedal shaft 57 through the guide slot 73 from outside of the arm section 71 of the separation member 67 and the insertion of the insert section 61 is restricted by the butting of the head 63 against the tip section 71a. The pin member 59 is located in a frontal position of the guide slot 73.

A stopper member 75 is provided on the tip section 71a of the arm section 71 to prevent the pin member 59 from coming out by contacting the head 63.

Next, the operation of the embodiment will be described. When no brake is applied, the brake pedal 11 is held in an initial position by biasing force of the return spring 43. When an occupant applies depression force to the pedal pad 41 of the brake pedal 11, the brake pedal 11 (or pedal arm 39) swings in a forward direction of the vehicle to press the push rod 45 forwardly. Hence, the depression force of the occupant is transmitted to the brake booster 19 through the push rod 45 and boosted therein. The boosted depression force is converted into hydraulic pressure by the master cylinder 21.

When an external force larger than a specified value is applied to the front part of the vehicle in an event of collision, the external force sometimes inputs to the dash panel 17 through the master cylinder 21 and the brake booster 19. In this case, the dash panel 17 is displaced backward.

Figure 4:
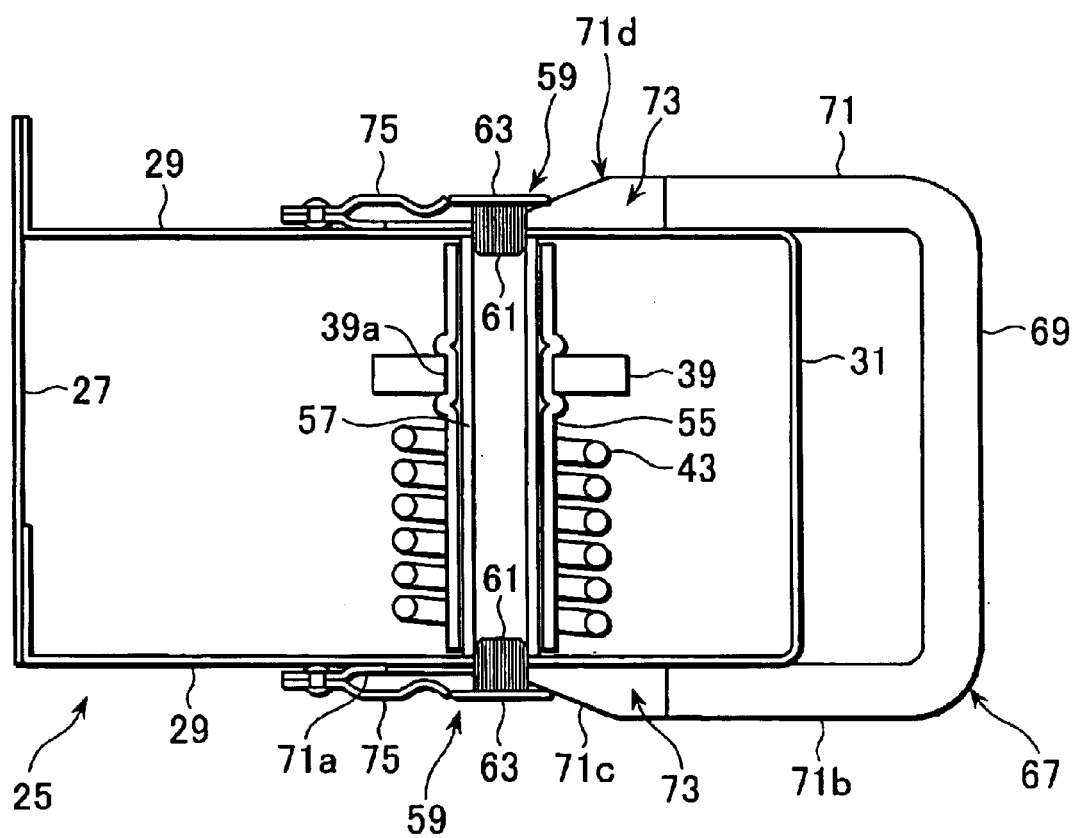
FIG. 4 is a view for explaining movements of components of a pedal supporting structure for a vehicle when an external force is inputted.

As shown in FIG. 4, when the dash panel 17 is displaced backward, the pedal bracket 25 is displaced backward together with the dash panel 17. On the other hand, the separation member 67 stays in an initial position because it is fixed to the support beam 65. Hence, there occurs a relative displacement between the pedal bracket 25 and the separation member 67. As a result, the pin member 59 relatively travels backward along the guide slot 73. At this moment, the head 63 of the pin member 59 goes apart from the stopper member 75 and strikes the slanted surface 71d formed in the middle of the arm section 71. Then, the pin member 59 is displaced along the axial direction of the pedal shaft 57 and the insert section 61 of the pin member 59 gradually comes out of the pedal shaft 57.

Figure 5:
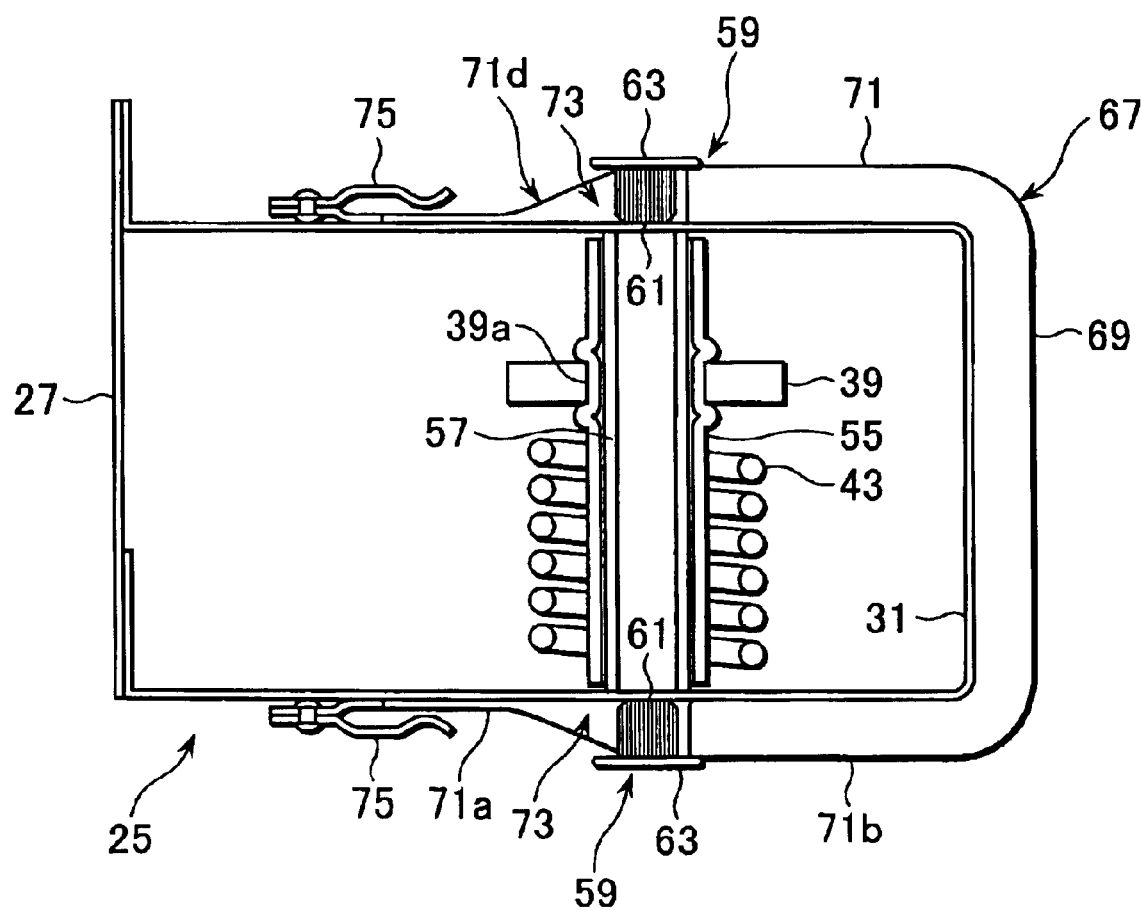
FIG. 5 is a view for explaining movements of components of a pedal supporting structure when an external force is inputted.

When the dash panel 17 further travels backward, as shown in FIG. 5, the head 63 of the pin member 59 contacts the base end section 71b of the arm section 71 and the insert section 61 of the pin member 59 completely comes out of the pedal shaft 57. When the pin member 59 comes out of the pedal shaft 57, the engagement of the pin member 59 with the pedal shaft 57 is released and the pedal shaft 57 goes apart from the pedal bracket 25. When the pedal shaft 57 comes apart from the pedal bracket 25, the brake pedal 11 rotates about the connecting section of the pedal arm 39 and the push rod 45 so as to displace the pedal pad 41 in the forward direction. As a result, the displacement of the brake pedal 11 in the backward direction is alleviated and a large space around the foot of the occupant can be secured.

Further, according to the pedal supporting structure of the embodiment, the stopper member 75 contacts the head 63 of the pin member 59 and prevents the pin member 59 from coming out of the pedal shaft 57. As a result, the engagement of the pin member 59 with the pedal shaft 57 can be securely prevented from being released.

Further, according to the pedal supporting structure of the embodiment, the pedal shaft 57 is provided across a pair of side panels 29, 29 of the pedal bracket 25 and is mounted on both side panels 29, 29 of the pedal bracket 25 by inserting the insert section 61 to the pedal shaft 57 from both sides thereof. Further, the separation member 67 draws the pin member 59 out of the pedal shaft 57 to release the engagement of the pin member 59 with the pedal shaft 57 and separates the pedal shaft 57 from the pedal bracket 25. As a result, the brake pedal 11 can be separated from the pedal bracket 25 in a more stable manner.

Further, according to the pedal supporting structure of the embodiment, the separation member 67 has the guide slot 73 capable of the relative replacement in a longitudinal direction of the vehicle of the pin member 59 in the paired arm members 71, 71. Hence, the pin member 59 can travel in the guide slot 73 and can be securely disengaged from the pedal shaft 57.

Figure 6:
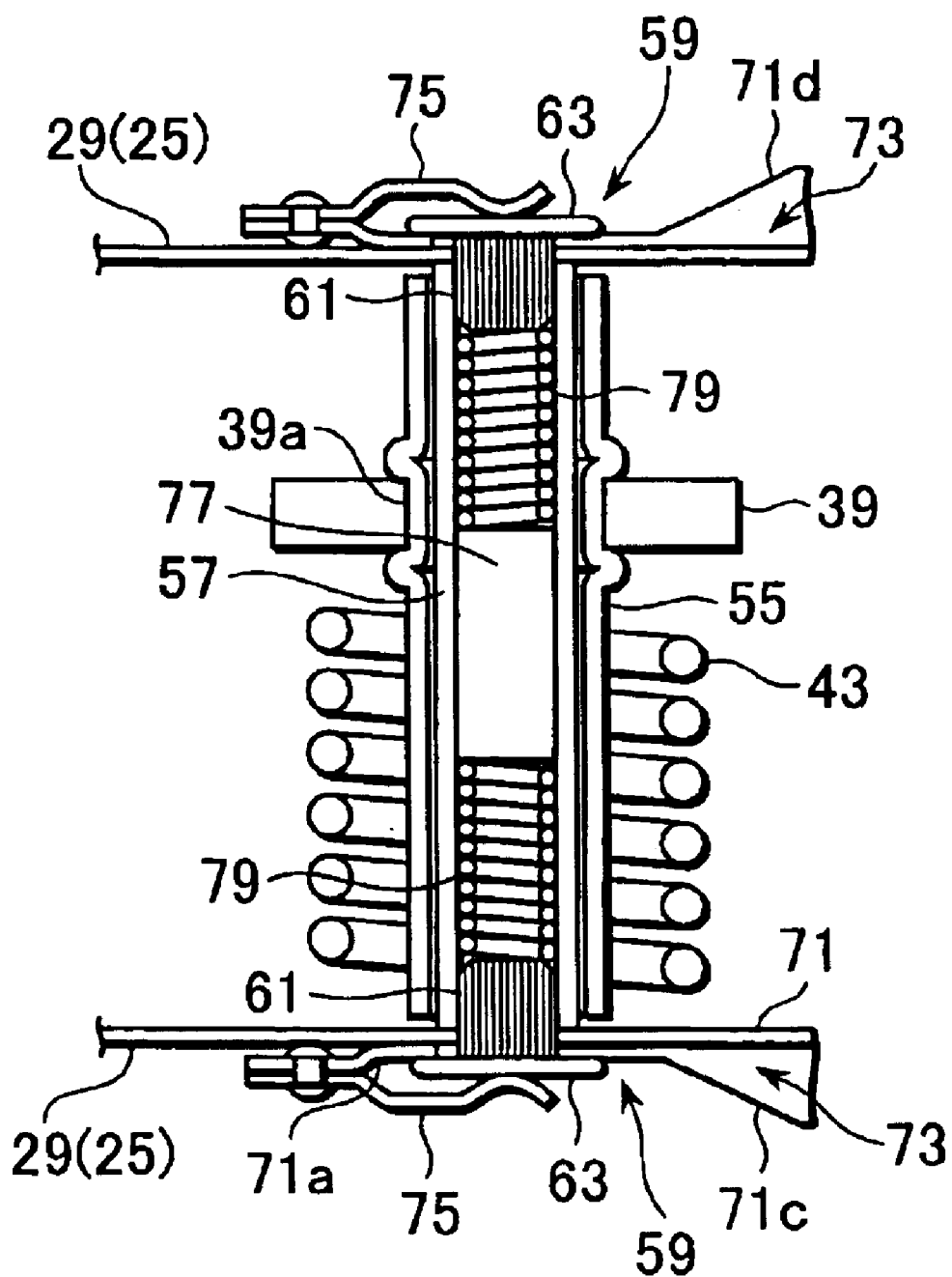
FIG. 6 is a sectional view showing a variation of a pedal supporting structure for a vehicle according to another embodiment of the present invention.

Referring to FIG. 6 showing another embodiment of the present invention, the pedal shaft 57 has a spring retainer 77 tightly fitted thereto in the middle part thereof. Further, the pedal shaft 57 has a spring member 79 biasing in a direction to release the engagement of the pin member 59 with the pedal shaft 57 on both sides of the pedal shaft 57 between the spring retainer 77 and the the insert section 61 of the pin member 59, respectively. The spring member 79 is connected at one end thereof with the pin member 59. In this embodiment, the pedal shaft 57 contains two spring members 79, 79 but either of these may be omitted.

Figure 7:
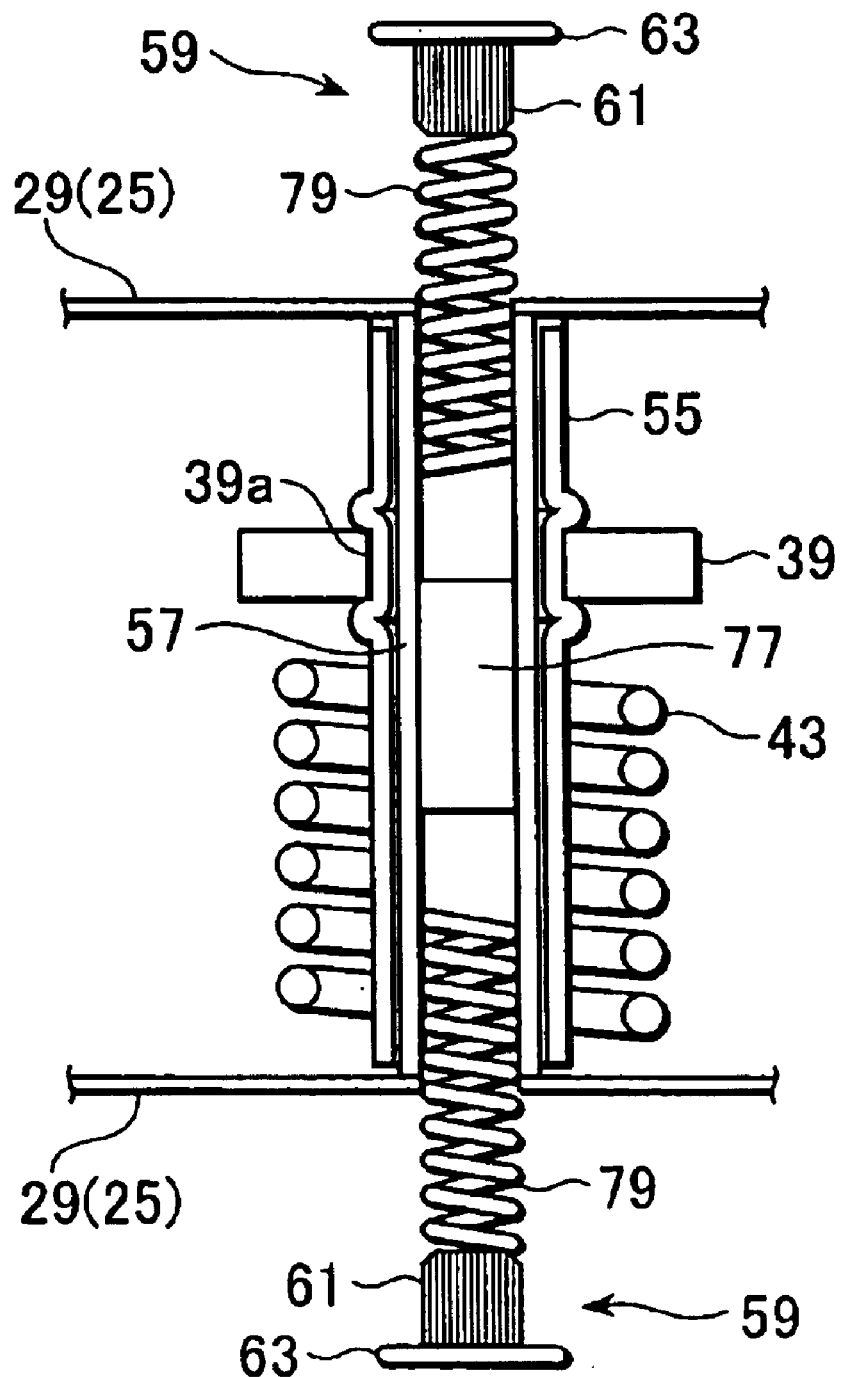
FIG. 7 is a view for explaining movements of components in a variation of a pedal supporting structure of another embodiment when an external force is inputted.

When an external force larger than a specified value is applied to the front part of the vehicle, the dash panel 17 is displaced backward and the pin member 59 is relatively displaced with respect to the separation member 67. As a result, the stopper member 75 comes out of the head 63 of the pin members 59 and as shown in FIG. 7 the pin member 59 is disconnected from the pedal shaft 57 by biasing force of the spring member 79. At this moment, since the spring member 79 is connected with the pin member 59, the spring member 79 comes out of the pedal shaft 57 together with the pin member 59. Accordingly, the brake pedal 11 can be securely disengaged from the pedal bracket 25.

Since the spring member 79 is provided in the pedal shaft 57, the disengagement of the pin member 59 from the pedal shaft 57 is swiftly performed and as a result the brake pedal 11 can be disengaged from the pedal bracket 25 in a more stable manner.

When there is no relative displacement between the pin member 59 and the separation member 67, since the stopper member 75 contacts the head 63 of the pin member 59, the pin member 59 never comes out of the pedal shaft 57.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A pedal supporting structure for supporting a pedal, comprising:

a pedal arm;

a pedal shaft for swingably supporting an upper end of said pedal arm;

a pedal bracket fixed on a first body member being displaced in a backward direction of said vehicle when an external force is applied to a front part of said vehicle;

a pin member for detachably mounting said pedal shaft on said pedal bracket; and a separation member fixed to a second body member being hard to be displaced with respect to the first body member when an external force is applied to a front part of said vehicle and provided behind said first body member, for releasing the engagement of said pin member with the pedal shaft by generating a relative displacement between said separation member and said pedal bracket when said external force is inputted and for separating said pedal shaft from said pedal bracket, wherein said separation member has a guide slot for allowing said pin member to relatively travel in a longitudinal direction of said vehicle.

2. The pedal supporting structure according to claim 1, wherein said separation member has a slanted surface for releasing the engagement of said pin member with the pedal shaft while pushing said pin member out of said pedal shaft in an axial direction of said pedal shaft.

3. The pedal supporting structure according to claim 1, wherein said separation member has a stopper means for preventing said pin member from coming out of said pedal shaft when said external force is applied.

4. The pedal supporting structure according to claim 1, wherein said pedal shaft is mounted on said pedal bracket by interleaving said pedal shaft between two opposed members of said pedal bracket and by engaging said pin member with said pedal shaft and is separated from said pedal bracket when said pin member comes out of said pedal shaft.

5. The pedal supporting structure according to claim 1, further comprising:

a spring member provided in said pedal shaft for biasing said pin member in a direction to release the engagement of said pin member with said pedal shaft.

* * * * *